United States Patent [19]

Goldenberg et al.

[11] Patent Number: 5,175,873
[45] Date of Patent: Dec. 29, 1992

[54] WATER RESISTANT SELECTIVE CALL RECEIVER

[75] Inventors: Michael P. Goldenberg, Boynton Beach, Fla.; Tek-Choy Kok, Singapore, Singapore; Martin D. McCluskie, Pompano Beach; Scott L. Dill, Boynton Beach, both of Fla.

[73] Assignee: Motorola, Inc., Schaumburg, Ill.

[21] Appl. No.: 632,871

[22] Filed: Dec. 24, 1990

[51] Int. Cl.⁵ .......................... H04B 1/38; H05K 7/00
[52] U.S. Cl. ........................... 455/89; 455/128; 455/347; 455/349; 455/351; 340/815.2; 340/815.15; 361/422
[58] Field of Search ............ 455/38, 40, 90, 347, 455/349, 351, 352, 128, 89, 38.4; 381/88; 361/422; 341/176; 340/825.44, 815.2, 815.15

[56] References Cited

U.S. PATENT DOCUMENTS 4,719,322  1/1988  Guzik et al. ............... 455/89
5,001,779  3/1991  Eggert et al. .............. 455/351

Primary Examiner—Reinhard J. Eisenzopf
Assistant Examiner—Almaz Woldu
Attorney, Agent, or Firm—William E. Koch; Thomas G. Berry

[57] ABSTRACT

A selective call receiver includes first and second housing portions forming a chamber therebetween which houses the electronic circuitry for receiving messages, a display for displaying the messages, and an annunciator for alerting a user that a message has been received. The first housing portion has an opening therein through which keys of an elastomeric keypad are accessible to the user. The keypad also includes a base portion for forming a seal between the first and second housing portions and a rim which extends into an additional opening in the first housing portion proximate the periphery thereof for sealingly receiving a lens therein.

9 Claims, 3 Drawing Sheets

WATER RESISTANT SELECTIVE CALL RECEIVER

FIELD OF THE INVENTION

This invention relates generally to selective call including an elastomeric keypad which seals the pager housing to prevent entry of contaminants and moisture.

BACKGROUND OF THE INVENTION

Communication systems in general, and paging systems in particular, have attained widespread use. In such paging systems, transmitted call signals are used to call selected receivers for the purpose of transmitting information from a base station to the selected receivers. Modern paging receivers have achieved multifunction capability through the use of microprocessors which allow the receivers to respond to information containing various combinations of tone, tone and voice, or data messages. This information may be transmitted using a variety of paging coding schemes and message formats.

Some considerations relating to the successful operation of a paging receiver relate to the portability of the receiver, battery saving, available memory, radio spectrum availability, and fast response time. Equally important, however, is the reliability of operation even in sometimes hostile environments; e.g., dusty or humid environments. The electrical circuitry and components are contained within a housing, the integrity of which has been typically maintained by mechanical means such as screws and fasteners, adhesives, sonic staking, etc. Unfortunately, none of these techniques are satisfactory for producing a water-tight seal.

SUMMARY OF THE INVENTION

According to a broad aspect of the invention, there is provided a selective call receiver including first and second housing portions which cooperate to form a chamber for receiving messages and alerting a user that a message has been received therebetween. Electronic circuitry is housed within the chamber. An elastomeric keypad, including at least one key accessible by the user from the exterior of the chamber, controls the electronic circuitry and forms a seal between the first and second housing portions.

DESCRIPTION OF THE PREFERRED EMBODIMENT

Figure 1:
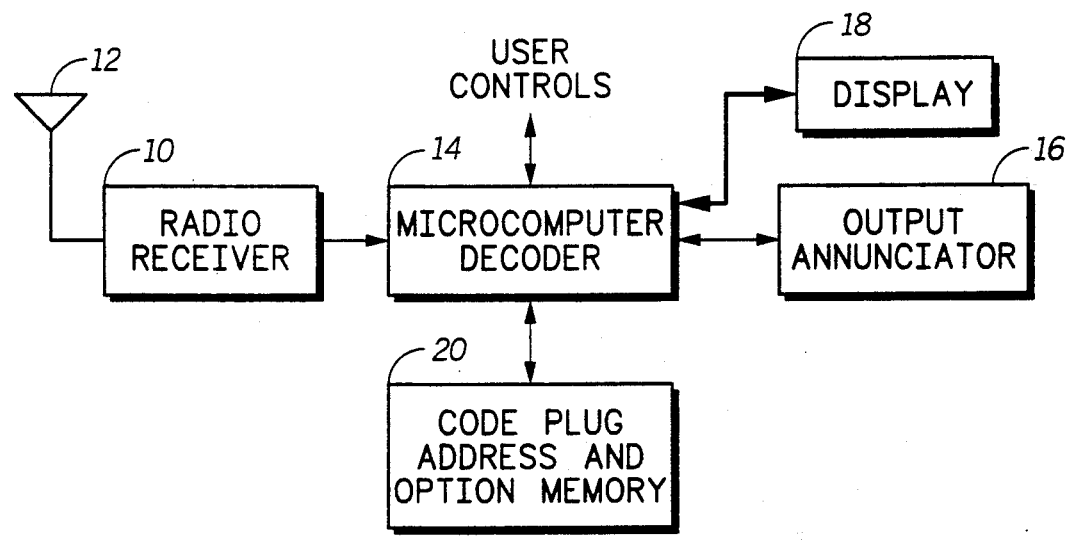
FIG. 1 is a block diagram of a typical pager.

FIG. 1 is a block diagram of a typical paging receiver. It includes a radio receiver 10 which receives signals via antenna 12. The output of radio receiver 10 is applied to a microcomputer decoder 14 which processes the information contained in the received signals. As can be seen, microcomputer decoder 14 communicates with output annunciator 16, display 18, code plug address and option memory 20, and the user via controls on the pager. The operation of a paging receiver of the type shown in FIG. 1 is well known and is described in U.S. Pat. No. 4,518,961 issued May 21, 1985, entitled "Universal Paging Device with Power Conservation."

Figure 2:
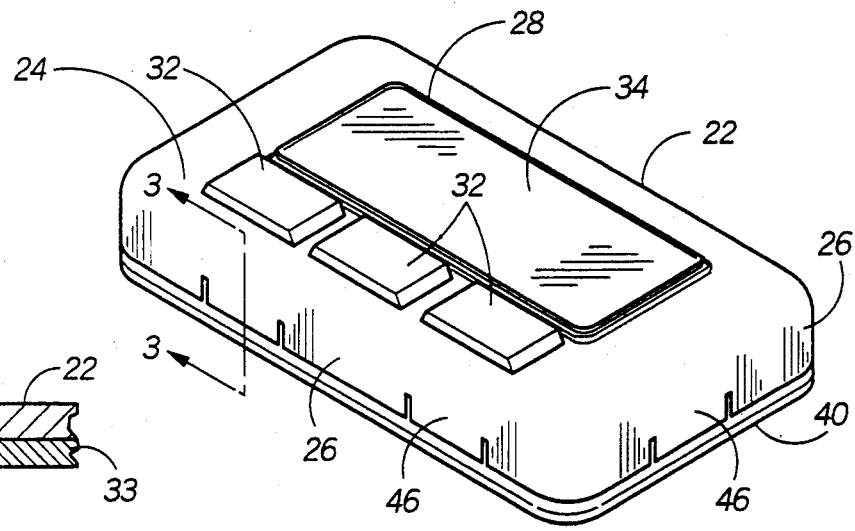
FIG. 2 is an isometric view of an electronic device (e.g., a pager) constructed in accordance with the teachings of the present invention.
Figure 3:
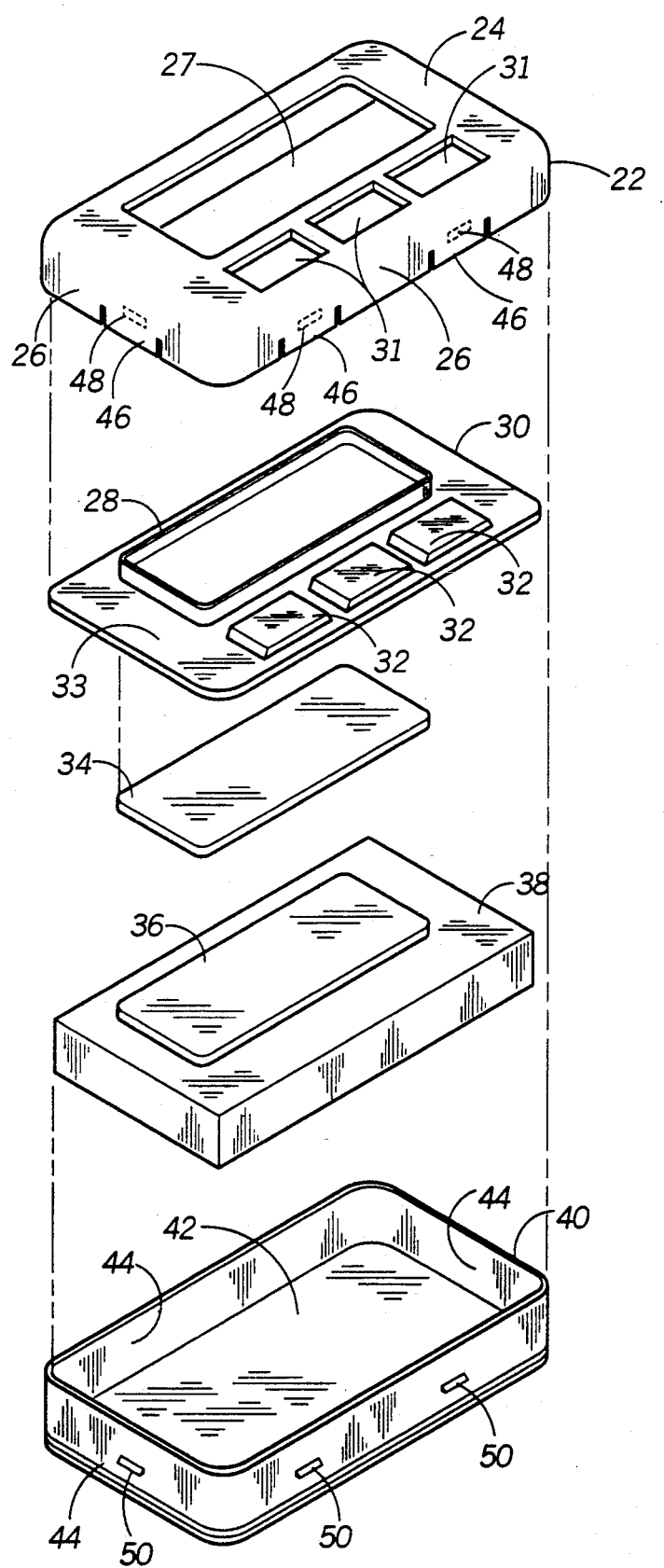
FIG. 3 is an exploded view of the device shown in FIG. 2.

FIGS. 2 and 3 illustrate in isometric and exploded form respectively a paging receiver constructed in accordance with the teachings of the present invention. As can be seen, the device includes a top portion 22 having a face 24 and side walls 26. An opening 27 is provided in face 24 which receives rim 28 of elastomeric keypad 30 having keys 32 and a base portion 33 (e.g., rubber, elastic, silicone, etc). Additional openings 31 are provided in face 24 for receiving control keys 32 therethrough rendering them accessible from the exterior of the housing.

Rim 28 is positioned so as to sealingly receive a lens 34 in a manner to be discussed further. Positioned beneath lens 34 is a liquid crystal display (LCD) 36 which is coupled to the pager electronics 38. While shown generally as a block, pager electronics 38 is intended to include, for example, receiver 10, antenna 12, microcomputer 14, code plug address and option memory 20, and output annunciator 16, all shown in FIG. 1. The lower portion of housing 40 has provided therein an elastomeric shock pad 42 and is equipped with side walls 44, thus defining a chamber for receiving the pager electronics 38 and LCD 36.

Figure 4:
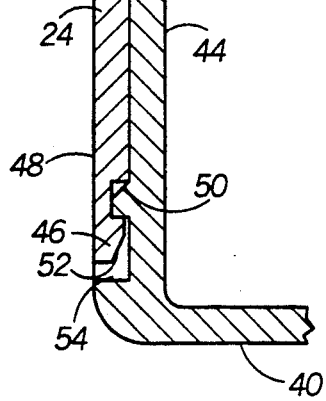
FIG. 4 is a cross-sectional view of the latching mechanism utilized in the device shown in FIG. 2.

Top housing portion 22 has a plurality of tabs 46 which are formed integrally with side walls 26. Each tab 46 is provided with an internal notch 48. Similarly, side walls 44 in lower housing portion 40 are provided with a plurality of protrusions 50 which are received within notches 48 to secure upper housing portion 10 to lower housing portion 40 as is shown in FIG. 4. That is, the edge of tabs 46 are each provided with an inclined inner edge 52 which will abut against protrusion 50 when the top outer housing portion 22 is inserted over lower housing portion 40. This will force tabs 46 outward until protrusions 50 fall into notches 48, thus locking the top and lower housing portions 22 and 40, respectively. The housing portions may be separated by inserting a screw driver or similar device into space 54 and prying tabs 46 outward.

Figure 5:
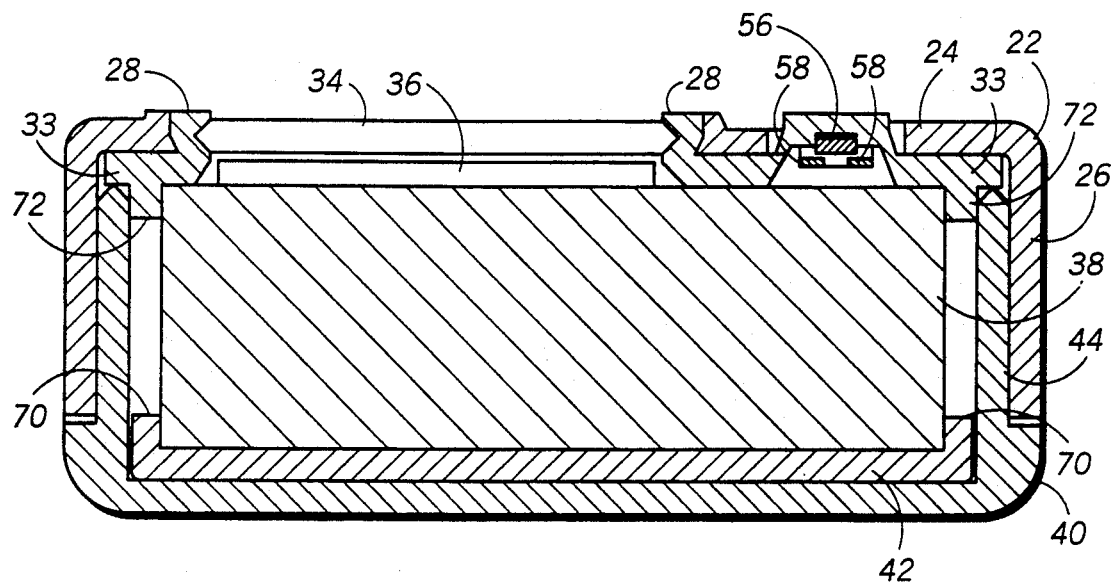
FIG. 5 is a cross-sectional view of the device shown in FIG. 1 and FIG. 2.

FIG. 5 is a cross-sectional view of the assembled pager shown in FIGS. 2 and 3. Like elements have been denoted with like reference numerals, and some of the details previously shown have been omitted for clarity. Elastomeric key 32 has provided therein a conductive rubber bead 56 made of, for example, carbon impregnated rubber, in accordance with well known techniques. Positioned beneath bead 56 are first and second contact regions 58 which are electrically coupled to pager circuitry 26. By depressing elastomeric key 32, bead 56 is caused to engage and thereby electrically connect contact portions 58.

As previously stated, a major disadvantage of prior art pager construction is in the production of a seal which will prevent moisture from entering the interior of the pager housing causing failure. The use of the elastomeric keypads, in accordance with the teachings of the present invention, permits a waterproof seal to be achieved. This is shown and described in connection with FIGS. 6A and B and FIG. 7.

Figure 6A:
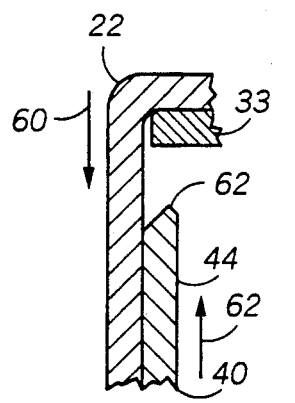
FIGS. 6A, 6B, and 7 are cross-sectional views which illustrate in detail how the device of FIG. 1 is sealed to prevent entry of contaminants and moisture.
Figure 6B:
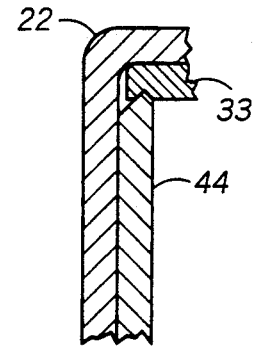
Figure 7:
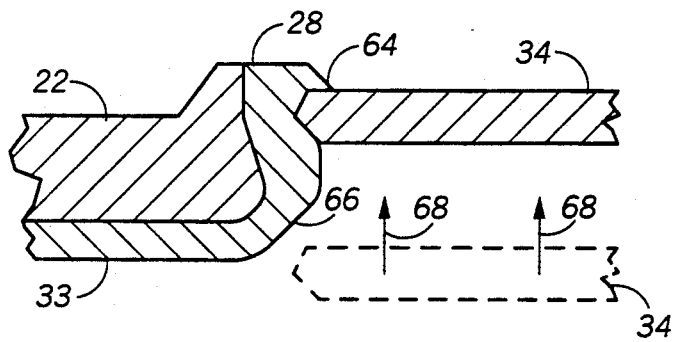

Referring to FIG. 6A, upper housing portion 22 is secured to lower housing portion 40 by telescopically moving them in the directions shown by arrows 60 and 62, respectively, until they latch as was described in connection with FIG. 4. Inner side wall 44 is provided with a knife edge 62 which presses into elastomer keypad 30 when upper and lower housing portions 22 and 40 are properly latched. This situation is shown in FIG. 6B. As can be seen, the edge of inner side wall 44 forces elastomer 30 against the inner surface of outer housing portion 22 and, to some extent, penetrates elastomer 30. Thus, with a relatively small amount of force, a tight seal is achieved which is impervious to contaminants and moisture. Referring now to FIG. 7, a tight seal is also achieved between lens 34 and the rim portion 28 of elastomeric keypad 30. Rim portion 28 is provided with a retaining lip 64 and a retaining ledge 66. Lens 34 is pushed in the directions indicated by arrows 68 overcoming the interference of retaining ledge 66 until it engages retaining lip 64. A tight interference fit is provided due to the shape of housing 22 surrounding rim 28. Retaining lip 64 prevents lens 34 from escaping the assembly, and the interference fit and elastomer more than adequately seal the lens perimeter.

Finally, it should be noted that shock pad 42 has turned up end portions 70. Similarly, elastomeric keypad 30 is provided with downturned portions 72 which, in connection with portions 70, permit the electronics 38 to be positioned within and float within an elastomeric housing, thus separating the electronics from the outer housing. In this manner, the electronics are protected from mechanical shock and vibration.

Thus, there has been provided an arrangement for manufacturing a housing which provides a effective seal against contaminants and moisture through the use of an elastomeric keypad. While the invention has been described in connection with a pager housing, it should be clear that this arrangement is applicable to any housing which must protect its contents from contaminants and moisture.

What is claimed is:

1. A selective call receiver of the type which includes a housing having a chamber therein for containing electronic circuitry which receives messages and alerts a user that a message has been received, and further including user control elements accessible by a user from the exterior of said housing, comprising:
    a first housing portion;
    a second housing portion for cooperating with said first housing portion to form said chamber;
    an elastomeric keypad for controlling said electronic circuitry and for forming a seal between said first and second housing portions, said housing portion having at least one opening therein, said elastomeric keypad comprising a base portion pressed between said first and second housing portions to form said seal, and at least one control key, said key being received through said at least one opening; and
    display means coupled to said electronic circuitry, comprising:
        an additional opening in said first housing portion positioned over said display means;
        a lens; and
        first means coupled to said base portion and extending into said additional opening for sealingly receiving said lens.

2. A selective call receiver according to claim 1 wherein said first means comprises a rim integrally formed with said base portion and extending into said additional opening proximate the periphery of said additional opening for retainably receiving said lens and forming a seal between said lens and said first housing portion.

3. A selective call receiver according to claim 2 wherein said rim includes a retaining lip and a retaining ledge for frictionally receiving said lens therebetween.

4. A selective call receiver according to claim 1 further comprising shock absorbing means positioned within said second housing portion, the combination of said display means and said electronic circuitry being cushioningly retained between said elastomeric keypad and said shock absorbing means.

5. A selective call receiver according to claim 4 wherein said shock absorbing means is an elastomeric pad.

6. A selective call receiver of the type which includes a housing having a chamber therein for containing electronic circuitry which receives messages, display means coupled to the electronic circuitry for displaying the messages, and annunciator means for alerting a user that a message has been received, comprising:
    a first housing portion having at least first and second openings therein;
    a second housing portion for cooperating with said first housing portion to form said chamber;
    an elastomeric keypad including a base portion for forming a seal between said first and second housing portions, at least one control key accessible through said first opening, and a rim extending into said second opening proximate the periphery thereof; and
    a lens for viewing said display means therethrough, said lens being sealingly received within said rim.

7. A selective call receiver according to claim 6 wherein said base portion is pressed between said first and second housing portions to form said seal.

8. A selective call receiver according to claim 6 wherein said rim includes a retaining lip and a retaining ledge for frictionally receiving said lens therebetween.

9. A selective call receiver according to claim 6 further comprising shock absorbing means positioned within said second housing portion, the combination of said electronic circuitry and said display means being cushioningly retained between said elastomeric keypad and said shock absorbing means.

* * * * *